United States Patent [19]
Arikawa et al.

[11] 3,745,294
[45] July 10, 1973

[54] METHOD OF SUBMERGED ARC WELDING HIGH TENSILE STRENGTH STEEL HAVING TRACE ELEMENTS OF VANADIUM OR NIOBIUM

[75] Inventors: Masayasu Arikawa; Motomi Kano, both of Fujisawa; Naoki Okuda, Kamakura, all of Japan

[73] Assignee: Kobe Steel, Limited, Kobe, Japan

[22] Filed: Dec. 28, 1970

[21] Appl. No.: 101,509

[30] Foreign Application Priority Data
Dec. 27, 1969 Japan.................................. 45/1848

[52] U.S. Cl.................. 219/73, 148/24, 148/26, 219/137, 219/146
[51] Int. Cl............................................... B23k 9/18
[58] Field of Search................... 219/146, 145, 137, 219/73; 117/202–206; 75/123; 148/23, 26

[56] References Cited
UNITED STATES PATENTS

| | | | |
|---|---|---|---|
| 3,110,798 | 11/1963 | Keay | 219/73 |
| 3,342,974 | 9/1967 | Wallner | 219/146 |
| 3,458,685 | 7/1969 | Tezuka et al. | 219/146 |
| 3,153,719 | 10/1964 | Arikawa et al. | 219/73 |
| 3,585,352 | 6/1971 | Zvanut | 219/146 |
| 3,423,565 | 1/1969 | Malchaire | 219/146 |
| 3,227,849 | 1/1966 | Thrlsch | 219/145 |

FOREIGN PATENTS OR APPLICATIONS

| | | | |
|---|---|---|---|
| 1,076,905 | 7/1967 | Great Britain | 219/146 |

*Primary Examiner*—J. V. Truhe
*Assistant Examiner*—George A. Montanye
*Attorney*—Oblon, Fisher & Spivak

[57] ABSTRACT

Steel is welded by submerged arc welding techniques using a steel wire comprising 0.2–2.5% Mn, 0.002–0.05% B and one or more of 0.005–0.5% Ti, Al and Zr and optionally a flux composition comprising a non-metallic flux powder and a metallic powder. The metallic powder contains 5–75% Fe, less than 5% Si and less than 10% Mn.

3 Claims, 14 Drawing Figures

Patented July 10, 1973 3,745,294
2 Sheets-Sheet 1
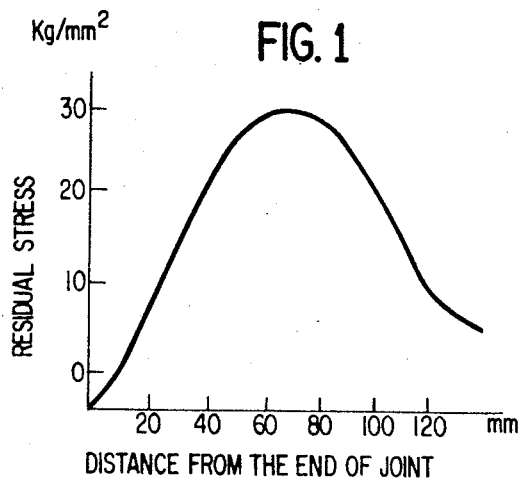
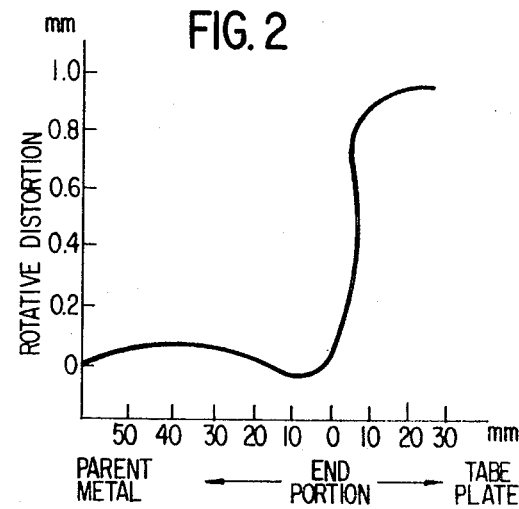
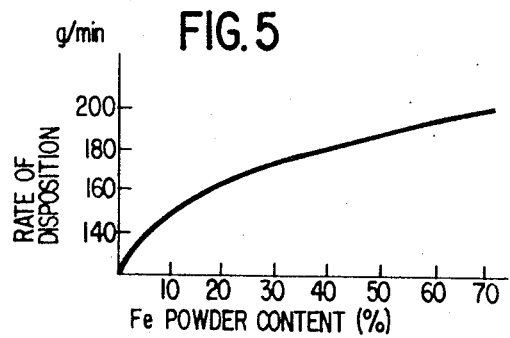
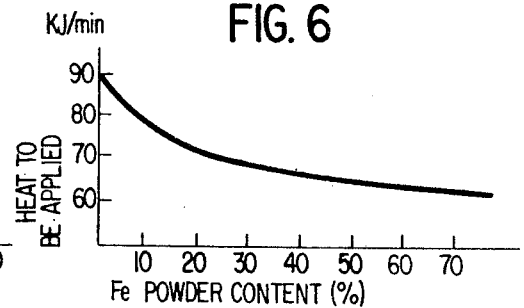
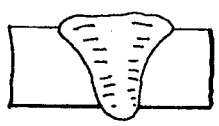
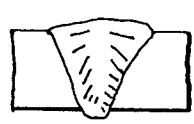
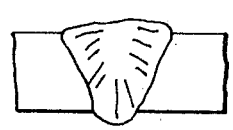
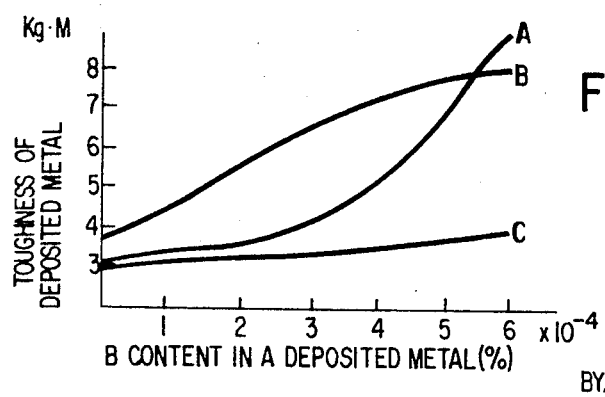
INVENTORS
MASAYASU ARIKAWA
MOTOMI KANO
NAOKI OKUDA
BY Obloy, Fisher & Spivak
ATTORNEYS FIG. 3A
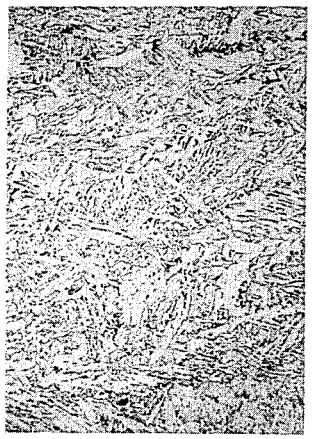
FIG. 3B
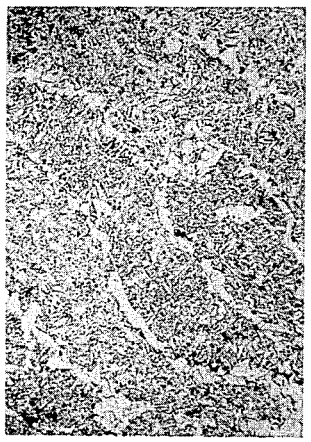
FIG. 3C
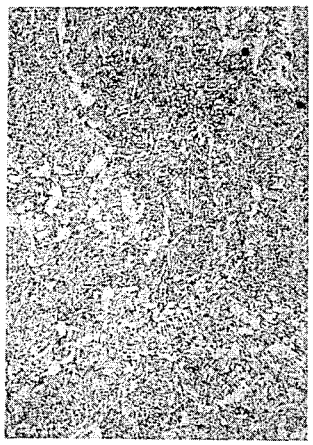
FIG. 8
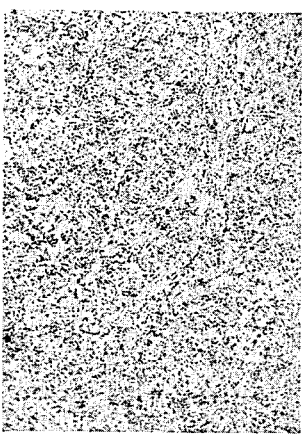
FIG. 9
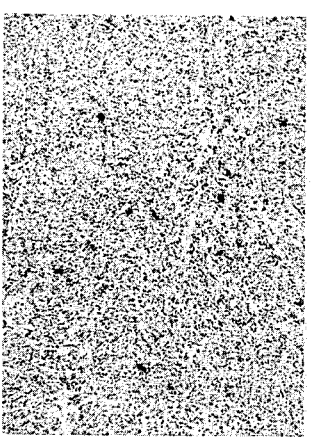
FIG. 10

METHOD OF SUBMERGED ARC WELDING HIGH TENSILE STRENGTH STEEL HAVING TRACE ELEMENTS OF VANADIUM OR NIOBIUM

BACKGROUND OF THE INVENTION

1. Field of the Invention

This invention relates to a method of submerged arc welding of steel, and a unique wire and flux composition useful in said welding process. More particularly, this invention relates to an improved method of submerged arc welding which is adapted to improve the mechanical properties of a deposited metal during single side or double side automatic arc welding.

2. Description of Prior Art

It has heretofore been recognized that there are a number of distinct disadvantages and difficulties which are encountered when steel, particularly high tensile steel, is submerged-melt arc welded and particularly one-side automatic arc welded.

Generally, if steel is submerged-melt arc welded, the crystalline structure of the deposited metal will be rough because of the very high amount of heat used in the process, and the impact strength of the deposited metal will be relatively lower as compared with that obtainable with other welding processes. In conventional one-side automatic arc welding processes, the degree of penetration of the deposited metal will be deeper and narrower than in normal submerged arc welding processes, but, since the heat used in that process is similarly quite high, the mechanical properties, particularly impact strength, will usually be greatly decreased. Moreover, in one side automatic arc welding, a "ghost portion" tends to be produced which also acts to decrease impact strength. The term "ghost portion" refers to the formation of a fragile area in the center of the deposited metal which can develop when a large portion of the weld crystals develop horizontally with respect to the surface of the work. The ghost portion is reduced as more of the crystal growth occurs in a vertical direction. Further, since the welded portion is melted simultaneously from the face of the work sheet to the back of the steel sheet, the coupling connection at the welding point will be completely separated so that as solidification occurs, large tear stresses will be applied to the deposited metal. A very large residual stress will be applied to the coupling end of the steel sheet, as shown in FIG. 1, and simultaneously a rotary deformation will occur, as shown in FIG. 2. These stresses can cause the welded steel to become extremely brittle. While it is necessary, therefore, to eliminate the "ghost portion" in automatic arc welding processes, that in itself, will not be sufficient to improve the impact strength of the welded material. It is also necessary to restrict the residual and rotary deformation stresses to obtain a high impact strength weld.

Another problem which has prevented full utilization of submerged arc welding processes, is that this technique is not readily adaptable to welding certain high tensile strength steels. It is common for commercial high tensile strength steels of high yield point to contain trace amounts niobium or vanadium. Although this type of steel is characterized by relatively low production cost, it is quite difficult to weld because of presence of the trace impurities, particularly with conventional submerged arc welding processes. The high tensile strength steel has a very high rate of dilution of the penetration of the base metal which can seriously affect submerged arc welding processes which are especially susceptible to the entrance of harmful trace elements into the deposited metal, as compared with hand welding processes. Thus, it has heretofore been very difficult to obtain a deposited metal of sufficient toughness when welding high tensile steels using the submerged arc welding technique.

SUMMARY OF THE INVENTION

It is, therefore, an object of the present invention to provide a method of either one side or two side submerged arc welding whereby a deposited metal of improved mechanical properties, particulary toughness, can be obtained.

It is another object of the present invention to provide a method of one side submerged arc welding whereby a weld of improved mechanical properties, particularly improved toughness of the deposited metal can be obtained.

It is a further object of this invention to provide a wire for use in the foregoing method of submerged arc welding.

It is still another object of this invention to provide a flux for use in the foregoing method of submerged arc welding.

These and other objects have now herein been obtained by providing a method of submerged arc welding in which a welding wire of the following composition is used: The welding wire of this invention is a steel wire containing:

|  | | |
|---|---|---|
|  | 0.2–2.5% | Mn |
|  | 0.002–0.05% | B |
| one or more | 0.005–0.5% | Ti, Al and/or Zr |
| less than | 1.2% | Mo |
| less than | 5% | Ni |
| less than | 6% | Cr |

Thus, according to the present invention, the deposited metal crystal is refined by the addition of certain elements which improve the toughness of the deposited metal.

Another feature of the method of submerged arc welding of this invention is that it has been found that particularly good results are obtainable, especially for one side automatic submerged arc welding, if the welding wire is used in combination with a specific flux comprising a mixture of a metallic powder and a non-metallic flux powder. The composition of the metallic powder component is:

|  | | |
|---|---|---|
|  | 5–75% | Fe |
| below | 5% | Si |
| below | 10% | Mn |

More than 80 percent of the metallic powder should be in a form of finer than 20 mesh.

The composition of the non-metallic flux powder is:

|  | | |
|---|---|---|
|  | 15–60% | MgO |
| one or more | 3–40% | Carbonate and/or oxalate |
|  | balance | Slag producing agent |

The non-metallic flux powder should have a basicity of 1.0 expressed in ratio of basic oxide to acid oxide. More than 70 percent of the entire flux should be finer than 8 mesh.

BRIEF DESCRIPTION OF THE DRAWINGS

A more complete appreciation of the invention will be readily obtained as the same becomes better understood by reference to the following detailed description when taken in conjunction with the accompanying drawings, wherein:

FIG. 1 is a graph showing the distribution of the residual stress of the welded portion;

FIG. 2 is a graph showing the rotary deformed amount of the end of the welding coupling;

FIGS. 3A, 3B and 3C are microscopic photographs showing the variation of structure of the welded portion with and without B and Ni.

FIG. 4 is a graph showing the effect of including both B and Ni of this invention;

FIG. 5 is a graph showing the relationship between the mixing amount of metal powder and the depositing speed;

FIG. 6 is a graph showing the relationship between the per cent of iron content in the metal powder and the quantity of heat required;

FIGS. 7A, 7B and 7C are sectional views of the welded portion showing the grain size of the metal powder and the penetration shape of the welded portion, and the developing state of the crystal grains;

FIGS. 8 – 10 are microscopic photographs of the welded portions performed by the method of this invention.

DESCRIPTION OF PREFERRED EMBODIMENTS

In the following description, all percents will be understood to mean percent by weight.

1. Wire

Manganese can be used in the wire composition in an amount of from 0.2–2.5 percent in order to improve the strength properties of the welded portion and to prevent the formation of cavities in the weld. If less than 0.2 percent manganese is used, the aforementioned desired effects cannot be expected, whereas if greater than 2.5 percent manganese is used, the welded metal will be abnormally hardened so that the crack resistance of the weld will be deteriorated.

Boron acts to refine the casting structure of the deposited metal and is present in the composition in amounts of from 0.002 percent to 0.05 percent. If greater than 0.05 percent is present, transversal cracks can occur on the surface of the deposited metal.

Ti, Al and Zr are optional elements. When one or more of these metals are used, they aid in bonding the boron to nitrogen to form BN, thereby preventing any long term weakening of the desired effects. If less than 0.005% Ti, Al or Zr is used, BN will be precipitated an acicular structure in the crystal and boundaries between the grains of the crystal will become too brittle. If greater than 0.5 % Ti, Al or Zr is added, the hardness of the metal will be increased to the point that the composition will become too fragile.

In addition to the aforementioned additive elements, one or more of Ni, Cr and/or Mo may be added in the above designated amounts to further improve the desired effects. That is, the addition of these elements improves the strength properties at high temperatures and improves the room temperature toughness. However, if any of these elements are used in amounts of above 5% Ni, 6% Cr, and/or above 1.2% Mo, the deposited metal will be hardened to the point that the strength will become abnormally high. From many experiments, it has been found that the presence of Ni is preferred, since it can coexist quite well with boron. In one-side automatic submerged arc welding, particularly, the desirable effect of Ni is easily recognizable. Thus, boron alone can be used to refine the casting structure, but, in order to reduce the "ghost" effect in one-side automatic arc welding, it is desirable to include Ni in the composition.

The wire may also contain such other elements as are normally present in arc welding wires, such as C, Si, P, or S. It is important, however, that the content of the additional materials be below 0.2% for C, below 0.5% for Si, below 0.05% for P and below 0.05% for S.

2. Flux

The iron powder in the flux will melt during welding and will become a part of the deposited metal. Accordingly, the amount of heat applied during welding can be reduced since the molten iron will add to the quantity of deposit from the wire. In other words, when iron powder is included in the flux, the same amount of deposited metal can be obtained as in conventional submerged arc welding processes, except that the heat requirements will be reduced. For this purpose, it is desirable to use between 5–75% Fe. Below 5 percent, the extent of the heat reduction will not be significant and above 75 percent, the system becomes impractical. The Fe will be deposited in the form of ferrite and the size of the ferrite crystals will be dependent upon the inverse proportion to the quantity of heat. If impurities such as FeO, $Fe_2O_3$, $Fe_2O_4$, C, P, and S are contained in the iron powder to too great of an extent, the improvement of the impact value will undesirably be influenced and possibly even completely cancelled. Accordingly, it is desirable that these impurities be contained in amounts of below approximately 10 percent.

The shape of penetration of the welded portion depends largely upon the size of the grains of the iron powder. Manganese has the effect of increasing the tensile strength of the deposited metal without embrittling it. It also acts to prevent cavities from forming in the deposited metal. If the amount of manganese exceeds 10 percent, however, the deposited metal will be undesirably hardened which can cause cracks to be generated. Si has the effect of mainly improving the X-ray performance and operability. If its content is too high, however, the crystal grains will become rough and cracking can occur. Its content, therefore, should be restricted to below 5 percent.

Ninety percent of any other additive contained in the metallic powder should have a fine particle form of less than 20 mesh size. If these particles are rough, the reaction time of the bottom of the deposited metal will be extremely short and segregation can occur during one-side automatic welding wherein deep penetration and large temperature gradients in the penetrating direction occur. Accordingly, it is required that the additive alloy powder be in the form of fine particles.

The aforementioned metal elements used in this invention may be added in the form of a single element or in the form of an alloy such as an alloy of iron. If an alloy of iron is used, the total iron content should nevertheless be within the specified range.

The non-metallic flux component is composed of slag producing agent, MgO and one or more of a carbonate and/or an oxalate. If the quantity of MgO is less than 15 percent, the viscosity of the slag produced during welding will be excessively small, and, particularly in the one-side automatic welding, the penetration shape will be in a mushroom form causing the crystal grains to develop horizontally at the lower portion from the center of the plate thickness. A fragile "ghost portion" can thus be produced in the center of the deposited metal. If the quantity of MgO exceeds 60 percent, the melting point of the slag will be excessively raised, so that during one-side automatic welding, a so-called pear shaped bead will be abruptly formed. Moreover, if the melting point of the slag is raised, the quantity of slag produced will be undesirably high so that the slag will not react sufficiently with the deposited metal and the residual oxygen content in the deposited metal will be undesirably increased.

It is effective to include in the flux one or more of 3–40 percent carbonate and/or oxalate which will generate CO or $CO_2$ gas by decomposition at the welding temperature so as to further prevent the segregation of the aforementioned additive elements combined in the flux. The generation of CO and $CO_2$ must be controlled, but should be somewhat explosive so that the molten metal will be agitated, thereby activating the chemical reaction and assisting the floating of fine oxides produced thereby. If the content of the carbonate or oxalate is below 3 percent or above 40 percent, the desired effect will not be obtained.

The remainder of the flux is composed of conventional slag producing agents, such as CaO, $Al_2O_3$, $SiO_2$, $TiO_3$, etc. However, it is necessary to adjust the basicity, expressed as the ratio of basic oxide content to acid oxide content, to a basicity of approximately 1.0 for the overall flux components. If the basicity of the flux is above 1.0, the quantity of oxygen existing as a fine inclusion in the deposited metal, in the form of metallic oxides, may be reduced. The metallic oxide, a non-metallic inclusion, has a lower melting point than that of iron, and will thus gather in the center of the finally solidified deposited metal to impart a high degree of brittleness which can cause crack formation. If the basicity is above 1.0, however, these inclusions will be reduced.

The reaction speed of the respective components will be improved if the flux is in a finely particulated form such that above about 70 percent of the grain constitution of the entire flux is below 8 mesh in size.

The flux of this invention is used during welding by being disseminated over the surface of the work, including the interior of the groove of the base metal. Alternatively, the flux may be used for back running in contact with the back surface of the groove.

Reference is now made to FIGS. 3, which shown microscopic photographs of the variation of structure of the welded portion with and without B and Ni. These microscopic photographs were taken of the center of the deposited metal after one-side automatic welding in one layer finishing of 50 Kg high tensile strength steel having a thickness of 30mm. and containing 1.2 – 1.3% Mn, 0.30–0.42% Si and 0.24–0.27% Mo (=150). FIG. 3A shows a welded material which does not contain B wherein its impact value is 3.1 kgm. FIG. 3B shows the welded material which contains 0.005% B added to the material shown in FIG. 3A, wherein its impact value is 3.9 kgm, and FIG. 3C shows the welded material which contains 0.004% B and 0.9% Ni, wherein the impact value is 8.7 kgm (measurements taken at −10°C in all cases).

FIG. 4 is a graph showing the variation in toughness as a function of the boron content of the deposited metal and the type of welding technique used, whether multi-layer welding in a submerged arc welding process or one-side automatic welding. The toughness of the deposited metal was measured at 0°C. Curve A repeats the results after one-side welding with Mn-Si-Mo-B-Ni type wire. Curve B represents the results after multi-layer welding with Mn-Si-Mo-B type wire, and Curve C represents the results after one-side automatic welding with a Mn-Si-Mo type wire. As can clearly be seen from the graph, particularly in one-side automatic welding, the coexistence of Ni and B is synergisticly more effective than the use of boron alone.

The wire also contains those elements conventionally contained in arc welding wires, such as C, Si, P or S, but the range of the contents must be below 0.2 % C, below 0.5% Si, below 0.05% P and below 0.05% S, as aforementioned.

FIG. 5 shows the relationship between the content of the iron powder and depositing speed when a material is welded at the conditions of 700 amps, 33 volts and 30 cm/min. of speed.

FIG. 6 shows the relationship between the content of the iron powder when 100 grams of deposited metal is obtained per minute on the same conditions as those in FIG. 5, and the heat required to obtain a constant quantity of deposited metal.

FIG. 7A is a diagramatic view of the welded portion showing the grain size of the metal powder, the penetrating shape of the welded portion and the developing state of the crystal grains when the ratio of those grains of greater than 20 mesh size and those grains of less than 20 mesh size is 50:50, very sharp penetration occurs wherein all of the crystal grains are developed in the horizontal direction so that a brittle "ghost portion" is thereby formed in the center of the deposited metal.

FIG. 7B is a diagramatic view of the welded portion showing the grain size of the metal powder, the penetrating shape of the welded portion, and the state of development of the crystal grains when the ratio of those grains of greater than 20 mesh size and those of less than 20 mesh size is 20:80. In this instance, the crystal grain initially develops in a vertical direction and gradually changes to horizontal growth. As shown in FIG. 7C, if 100 percent of the grain size is finer than 20 mesh, the crystal grains will develop totally upward so that the fragile portion in the center will be extremely small.

Having now generally described the invention, a further understanding can be obtained by reference to certain specific examples which are provided herein for purposes of illustration only and are not intended to be limiting in any manner.

The following Examples will be grouped into two classes, A and B. In class A, a wire of specified composition according to the present invention is used in combination with the conventional flux. In class B, a wire of the present invention is used in combination with the flux of the present invention.

GROUP A

EXAMPLE 1

Welds were formed using a conventional sintered flux and two electrodes. Welding occurred in one layer at both sides of an X type groove. The welding conditions were as follows:

First pass: Forehand electrode:900A-36V
Backhand electrode:900A-40V }42 cm/min.

Second pass: Forehand electrode: 1200A-36V
Backhand electrode: 1200A-40V } 46 cm/min.
(All diameters of wires were 4.8mm.)

The test plate had an X groove of 70° groove angle in a steel plate of 32mm in thickness. The composition of the steel plate is shown in Table 1. The composition of the flux is shown in Table 2. The composition of the wire is shown in Table 3. The mechanical properties of the welded portion is shown in Table 4.

Table 1: Chemical Composition of Steel Plate (%)

| Steel plate | Composition | | | | | |
|---|---|---|---|---|---|---|
| | C | Mn | Si | P | S | Nb |
| S1 | 0.18 | 1.43 | 0.48 | 0.021 | 0.023 | 0.053 |

TABLE 2
Weights of flux blending (part)

| Rare materials flux | Magnesia clinker | Lime carbonate | Fluorite | Alumina | Silica sand | Rutile | Soda silicate | Si |
|---|---|---|---|---|---|---|---|---|
| F1 | 33 | 16 | 10 | 10 | 17 | 4 | 7 | 2 |

TABLE 3
Chemical composition of wires (percent)

| Wires | C | Mn | Si | B | Ti | Al | Zr | Ni | Cr | Mo |
|---|---|---|---|---|---|---|---|---|---|---|
| W1 | 0.07 | 0.85 | 0.15 | | | | | | | |
| W2 | 0.06 | 0.95 | 0.14 | 0.001 | | 0.23 | | | | |
| W3 | 0.09 | 0.70 | 0.16 | 0.002 | 0.005 | | | | | |
| W4 | 0.07 | 0.86 | 0.16 | 0.008 | 0.005 | | | | 0.30 | |
| W5 | 0.11 | 0.99 | 0.17 | 0.015 | 0.05 | 0.04 | 0.05 | | | 0.20 |
| W6 | 0.08 | 1.12 | 0.14 | 0.022 | 0.50 | | | | | |
| W7 | 0.13 | 1.10 | 0.20 | 0.010 | | 0.51 | | | | |
| W8 | 0.12 | 1.26 | 0.13 | 0.012 | 0.01 | 0.02 | 0.12 | | 0.83 | |
| W9 | 0.06 | 0.65 | 0.15 | 0.029 | 0.02 | | | | | |
| W10 | 0.07 | 0.72 | 0.16 | 0.035 | 0.15 | 0.08 | 0.07 | | | |
| W11 | 0.15 | 0.84 | 0.15 | 0.016 | 0.04 | | 0.03 | | | 0.50 |
| W12 | 0.09 | 0.60 | 0.19 | 0.048 | | | 0.50 | | | |
| W13 | 0.12 | 1.05 | 0.13 | 0.050 | | | | | | |
| W14 | 0.07 | 1.15 | 0.12 | 0.065 | | | | | | |
| W15 | 0.08 | 1.15 | 0.19 | 0.007 | | 0.62 | | | | |
| W16 | 0.14 | 1.40 | 0.21 | 0.009 | 0.61 | | | | | |
| W17 | 0.06 | 1.75 | 0.16 | | 0.20 | 0.30 | | | | |
| W18 | 0.07 | 1.63 | 0.14 | | 0.46 | | 0.03 | | | |
| W19 | 0.07 | 1.19 | 0.16 | 0.012 | | | | | | |
| W20 | 0.06 | 1.10 | 0.14 | 0.002 | 0.002 | | 0.002 | | | |
| W21 | 0.07 | 0.90 | 0.16 | 0.002 | | | | | | |

Table 4: Mechanical Properties of Deposited Metal

| Used Wire | Impact Values kgm | | | Tensile Strength (kg/cm²) | Elongation % |
|---|---|---|---|---|---|
| | −10°C. | −20°C. | −30°C. | | |
| W1 | 3.4 | 3.0 | 2.6 | 60.1 | 27 |
| W2 | 3.5 | 3.1 | 2.5 | 60.5 | 26 |
| W3 | 8.6 | 6.9 | 5.3 | 59.5 | 27 |
| W4 | 12.6 | 10.9 | 9.1 | 59.8 | 27 |
| W5 | 15.5 | 14.0 | 11.7 | 61.6 | 26 |
| W6 | 16.0 | 14.7 | 11.6 | 63.2 | 25 |
| W7 | 13.3 | 10.9 | 9.2 | 63.2 | 26 |
| W8 | 14.5 | 11.5 | 9.8 | 64.4 | 24 |
| W9 | 14.1 | 12.2 | 10.8 | 62.5 | 25 |
| W10 | 16.9 | 14.7 | 12.4 | 63.3 | 25 |
| W11 | 16.3 | 15.1 | 12.8 | 62.7 | 25 |
| W12 | 9.8 | 7.7 | 6.9 | 63.9 | 24 |
| W13 | 11.8 | 8.8 | 7.6 | 64.6 | 23 |
| W14 | 13.2 | 9.7 | 7.7 | 68.2 | 20 |
| W15 | 12.2 | 10.1 | 8.6 | 66.4 | 22 |
| W16 | 11.9 | 10.6 | 8.8 | 67.2 | 21 |
| W17 | 3.9 | 3.5 | 2.8 | 64.4 | 23 |
| W18 | 4.2 | 3.4 | 2.9 | 64.3 | 23 |
| W19 | 7.4 | 6.5 | 5.2 | 59.8 | 28 |
| W20 | 6.4 | 5.3 | 4.1 | 59.3 | 28 |
| W21 | 6.3 | 5.4 | 4.0 | 59.1 | 28 |

EXAMPLE 2

Welds were formed using a conventional sintered flux. The test piece had an X groove of 40° groove angle (front side) and 60° (back side) in a steel plate of 32mm in thickness. Table 5 shows the weight of flux blending (part). Table 6 shows the composition of the wire, Table 7 shows examples of impact values of the deposited metal. The chemical composition of the test piece is the same as that in Example 1. An iron powder containing flux with a copper backing was used for one-side welding. The welding conditions were as follows:

TABLE 5
Weights of flux blending (part)

| Raw material flux | Magnesia clinker | Lime carbonate | Fluorite | Alumina | Silica sand | Rutile | Soda silicate | Mn |
|---|---|---|---|---|---|---|---|---|
| F2 | 33 | 16 | 10 | 10 | 17 | 4 | 7 | 4 |

TABLE 6
Chemical composition of wire (percent)

| Iron powder | Wires | Composition | | | | | | |
|---|---|---|---|---|---|---|---|---|
| | | C | Mn | Si | B | Ti | Al | Zr |
| 45 | W22 | 0.06 | 0.25 | 0.48 | | | | |
| | W23 | 0.07 | 0.20 | 0.41 | 0.018 | | | |
| | W24 | 0.06 | 0.35 | 0.50 | 0.017 | 0.10 | 0.20 | 0.05 |
| | W25 | 0.07 | 0.40 | 0.39 | 0.025 | 0.25 | 0.10 | |

Table 7: Impact Value of Deposited Metal
(Average of three welded metals)

| Used wires | Impact Value (kgm) | | |
|---|---|---|---|
| | −10°C. | −20°C. | −30°C. |
| W22 | 2.8 | 2.2 | 1.8 |
| W23 | 6.8 | 5.4 | 4.2 |
| W24 | 8.6 | 6.9 | 5.6 |
| W25 | 9.8 | 8.2 | 6.3 |

EXAMPLE 3

Welds were formed on one side of a work piece in combination with a fused flux, using a flux containing a thermosetting resin. The test piece was a steel plate of 25mm thickness having a 40° angle Y groove. Table 8 shows the composition of the steel plate, Table 9 shows the composition of the flux, Table 10 shows the composition of the wire, and Table 11 shows examples of impact values of the deposited metal. The welding conditions were:

Forehand electrode: 1200A-24V 40 cm/min.
Backhand electrode: 1200A-40V 40 cm/min.
(Diameters of wires of forehand and backhand electrodes are 4.8 and 6.4mm, respectively.)

Table 8: Chemical Composition of Steel plate (%)

| Steel plate | C | Mn | Si | P | S | Nb |
|---|---|---|---|---|---|---|
| S2 | 0.17 | 1.41 | 0.46 | 0.020 | 0.022 | 0.052 |

TABLE 9
Composition of flux (percent)

| Flux | SiO$_2$ | MnO | CaO | MgO | Al$_2$O$_3$ | CaF$_2$ | TiO$_2$ |
|---|---|---|---|---|---|---|---|
| F3 | 38 | 22 | 20 | 5 | 3 | 10 | 2 |

TABLE 10
Chemical composition of wire (percent)

| Wire | C | Mn | Si | B | Ti | Al | Zr |
|---|---|---|---|---|---|---|---|
| W26 | 0.08 | 1.85 | 0.03 | | | | |
| W27 | 0.07 | 1.90 | 0.03 | 0.017 | | | |
| W28 | 0.09 | 1.88 | 0.04 | 0.016 | 0.10 | 0.20 | 0.05 |
| W29 | 0.07 | 1.86 | 0.03 | 0.035 | 0.25 | 0.15 | |

Table 11: Impact Value of Deposited Metal
(Average of three welded metals)

| Used Wire | Impact value (kgm) | | |
|---|---|---|---|
| | −10°C. | −20°C. | −30°C. |
| W26 | 3.6 | 2.9 | 2.1 |
| W27 | 8.2 | 6.6 | 5.3 |
| W28 | 9.9 | 8.3 | 7.0 |
| W29 | 12.4 | 10.8 | 8.8 |

As can be seen from a comparison of Table 7 in Example 2 with Table 11 of Example 3, equivalent welding effects can be obtained by either single side or double side-single layer technique. More particularly, the impact value of the deposited metal welded by the wire containing no B is very low, but that of the deposited metal containing B is very much improved. The impact value of the deposited metal welded by the wire containing B and one or more of Ti, Al and Zr is further improved in comparison with that of the metal containing only B.

EXAMPLE 4

Welds were formed using a wire containing Ni, Cr and Mo in a low temperature steel and in a high tensile steel, of the type usually used for high toughness at extremely low temperatures. The wire contained the aforesaid elements and a deposited metal having the following mechanical properties was obtained.

The test piece had a 70° angled (front and rear) X groove in a steel plate having a thickness of 20mm. Table 12 shows the chemical composition of the steel plate, Table 13 shows the composition of the flux, Table 14 shows the composition of the wire, Table 15 shows the impact strength of the low temperature steel, and Table 16 shows the mechanical properties of the high tensile steel. A neutral fused flux, and the welding conditions were as follows:

First pass: 690A-35A-35cm/min.
Second pass: 780A-36V-35cm/min.
(Diameter of wire is 4.8mm.)

TABLE 12
Chemical composition of the steel plate (percent)

| Steel plate | C | Mn | Si | P | S | Ni | Cr | Mo |
|---|---|---|---|---|---|---|---|---|
| S4 (low temperature steel) | 0.11 | 0.55 | 0.27 | 0.013 | 0.010 | 3.28 | | |
| S4 (high tensile steel) | 0.15 | 0.58 | 0.30 | 0.015 | 0.017 | | 5.03 | 0.51 |

TABLE 13
Composition of flux (percent)

| Flux | SiO$_2$ | MnO | CaO | MgO | Al$_2$O$_3$ | CaF$_2$ | TiO$_2$ |
|---|---|---|---|---|---|---|---|
| F4 | 40 | 21 | 19 | 5 | 3 | 10 | 2 |

TABLE 14
Chemical composition of wires (percent)

| Wires | C | Mn | Si | B | Ti | Al | Zr | Ni | Cr | Mo |
|---|---|---|---|---|---|---|---|---|---|---|
| W30 | 0.12 | 1.90 | 0.04 | 0.012 | 0.25 | 0.05 | | | | |
| W31 | 0.09 | 1.90 | 0.03 | | | | | 2.30 | | 0.60 |
| W32 | 0.10 | 1.85 | 0.03 | 0.012 | 0.25 | | | 2.10 | | 0.55 |
| W33 | 0.11 | 1.95 | 0.03 | 0.013 | | 0.10 | 0.20 | 2.15 | | 0.88 |
| W34 | 0.10 | 2.00 | 0.03 | 0.013 | | 0.25 | 0.05 | 2.10 | | 1.20 |
| W35 | 0.09 | 1.93 | 0.04 | 0.014 | 0.15 | 0.10 | | 0.48 | | 0.52 |
| W36 | 0.11 | 2.10 | 0.05 | 0.013 | 0.20 | | 0.20 | 1.03 | | 0.55 |
| W37 | 0.10 | 2.02 | 0.05 | 0.014 | 0.25 | 0.10 | | 2.78 | | 0.50 |
| W38 | 0.12 | 1.98 | 0.06 | 0.012 | | 0.25 | 0.10 | 4.00 | | 0.54 |
| W39 | 0.12 | 2.35 | 0.04 | | | | | | 1.42 | 0.51 |
| W40 | 0.12 | 2.31 | 0.04 | 0.015 | | | | | 1.39 | 0.49 |
| W41 | 0.13 | 2.29 | 0.03 | 0.015 | 0.02 | | 0.05 | | 1.38 | 0.49 |
| W42 | 0.12 | 2.35 | 0.03 | 0.014 | 0.35 | | | | 2.40 | 0.50 |
| W43 | 0.13 | 2.50 | 0.04 | 0.013 | 0.10 | 0.25 | | | 3.35 | 0.49 |
| W44 | 0.12 | 2.41 | 0.04 | 0.015 | | 0.30 | 0.10 | | 4.50 | 0.30 |
| W45 | 0.13 | 2.30 | 0.03 | 0.014 | 0.05 | 0.10 | 0.20 | | 6.00 | 0.11 |

Table 15: Impact Value of Low Temperature Steel
(Average of three welded steels)

| Used Wire | Impact Value (kgm) | | |
|---|---|---|---|
| | −60°C. | −80°C. | −100°C. |
| W30 | 5.6 | 4.1 | 2.8 |
| W31 | 3.8 | 2.2 | 1.1 |
| W32 | 8.9 | 6.5 | 5.6 |
| W33 | 9.1 | 6.7 | 5.8 |
| W34 | 9.4 | 6.8 | 6.1 |
| W35 | 7.0 | 4.9 | 3.8 |
| W36 | 8.4 | 6.3 | 5.2 |
| W37 | 9.5 | 7.2 | 6.0 |
| W38 | 10.5 | 8.7 | 6.7 |

NOTE: Used S-3 steel plate

Table 16: Mechanical Properties of High Tensile Steel
(Annealed to remove stress at 720–750°C.)

| Used Wire | Impact Value (kgm) | | Tensile Test Tensile Strength (kg/mm.$^2$) | Elongation (%) mm.$^2$ |
|---|---|---|---|---|
| | +20°C. | 0°C | | |
| W39 | 6.4 | 4.5 | 60.6 | 29 |
| W40 | 10.6 | 7.5 | 61.0 | 28 |
| W41 | 15.9 | 13.6 | 61.4 | 28 |
| W42 | 15.2 | 13.6 | 63.2 | 27 |
| W43 | 14.8 | 12.9 | 65.3 | 26 |
| W44 | 14.3 | 12.6 | 67.4 | 25 |
| W45 | 14.0 | 12.1 | 69.2 | 24 |

NOTE: 1. Impact value was derived by the average of three steels
2. Used S-4 test piece.

As seen from the Table 4, if a slight amount of boron and one or more of Ti, Al and Zr are added to the metal, the toughness of the deposited metal will be vastly improved. The toughness of the wires W13 and W14 containing only boron is good, however, in comparison with the wires W6 and 10 containing boron and one or more of Ti, Al and Zr, the toughness of the deposited metal is further improved even though the former contains less boron.

As seen from the microscopic photographs (FIGS. 8 to 10) large ferrite crystals are retained in the deposited metal welded by the wire W1 (FIG. 8) containing no B, Ti, Al or Zr, but almost no ferrite was formed in the deposited metal using wire W13 containing only B (FIG. 9) and by the wire W10 (FIG. 10) containing B and one or more of Ti, Al and Zr in which a very fine structure was obtained.

It is very clear that nitrogen, oxygen, carbon, etc., can adversely affect the toughness of the deposited metal. When B alone is present, the crystal grains will ordinarily be extremely fine. If nitrogen, oxygen, carbon, etc., is present, the desirable characteristics obtainable with B is somewhat decreased. Moreover, when nitrogen is present, boron will tend to bond with the nitrogen contained in the deposited metal to form BN which will further diminish the desirable effects of the boron. For this reason, in order to obtain adequate toughness using boron alone, the quantity of boron used must be quite high. This can result, however, in an increase in the tensile strength to the point at which the deposited metal can be cracked.

On the other hand, although Ti, Al and Zr have strong deacidification and denitrification capabilities, the presence of these materials without boron will not improve the toughness of the deposited metal, as can be seen from wires W17 and W18 in Table 4. If one or more of these metals are used in at least a small amount with boron, the boron will be prevented from bonding with nitrogen to form BN with the result that the effect of the boron will become significant and the adverse effects of nitrogen with the deposited metal will be substantially reduced.

When Ti, Al and/or Zr is used in combination with a large quantity of boron, the tensile strength will be increased, but the impact strength will not be significantly improved as can be seen from wires W15 and W16 in Table 4. In other words, when one or more of Ti, Al and/or Zr is added in at least some quantity to the wire with boron, the toughness of the deposited metal will be greatly improved, however, the degree of toughness is not necessarily proportional to the quantity of the additives. i. e., a greater quantity of additive will not necessarily have greater effect. On the other hand, it should be clearly understood from a comparison of wires W3, W7 and W10 with wires W13 and W14 in Table 4 that the greater quantity of boron, the greater the degree in improvement in toughness of the deposited metal. Even if only small amounts of Ti, Al and/or Zr are added to the wire with the boron, the toughness of the deposited metal will be greatly improved, even if the quantity of boron is also small. Thus, the addition of one or more of Ti, Al and/or Zr may not excessively harden the deposited metal so far as tensile strength is concerned, but it may eliminate the danger of the metal being cracked while obtaining a high degree of toughness.

In summary of the results from the Table 4:

a. The addition of 0.001 percent boron to the wire does not affect the toughness of the deposited metal, but significant improvement in toughness is obtained if more than 0.001 percent boron is used. However, if boron is is added above 0.050 percent, the tensile strength of the deposited metal will become excessively high and cracking can occur.

b. If one or more of Ti, Al and/or Zr are used in a total amount of more than 0.002 percent, in combination with more than 0.002 percent boron, the toughness of the deposited metal will be greatly improved. However, if the Ti, Al and/or Zr is added above 0.50 percent total content, the tensile strength of the deposited metal will be excessively increased.

c. If one or more of Mo, Ni, etc., is added to the wire containing boron in addition to one or more of Ti, Al and Zr, a synergistic effect is observed whereby the toughness of the deposited metal is synergistically improved.

d. If one or more of Ti, Al and/or Zr is added to the wire without boron, no improvement in the toughness of the deposited material is observed.

Mo may be added to the wire to raise the strength and toughness of the deposited metal, Ni may be added to the wire to increase the toughness of the metal at extremely low temperatures, and Cr may be added to raise the strength of the metal.

As can be seen from the results of Table 15, as the content of Mo is increased in wires W32, W33 and W34, the toughness of the deposited metal is correspondingly increased. As Ni is increased in wires W35, W36, W32, W37, and W38, the toughness of the deposited metal is increased. Comparing wire W31 with wire W32, it is clear that the toughness of the deposited metal welded by the wire containing boron and one or more of Ti, Al and Zr, is improved.

As can clearly been seen from Table 16, as the amount of Cr is increased, the strength of the deposited metal is increased accordingly. As can be seen by comparing wire W39 with wire W40, the toughness of the deposited metal welded by wire W40 containing boron is increased, and the toughness of the deposited metal welded by wire W41 containing boron and one or more of Ti, Al and/or Zr is stronger than that of the metal welded by use of wire W40 containing boron alone.

If B and one or more of Ti, Al and Zr are added to the wire together with Cr, the strength of the deposited metal welded by the wire may be raised without lowering the toughness of the deposited metal.

GROUP B

EXAMPLE 5

The compositions of the base metal steel plate, flux and electrode wire used in this example are as shown in Tables 17 and 18.

Table 17: Chemical Composition of Base Metal Steel Plate (%)

|  | C | Mn | Si | P | S | Nb |
|---|---|---|---|---|---|---|
| Steel Plate | 0.16 | 1.36 | 0.44 | 0.021 | 0.017 | 0.047 |

TABLE 18

Composition of sintered flux (percent)

| | Magnesia clinker | Lime carbonate | Fluorite | Alumina | Silica sand | Calcium oxalate | Iron powder | FeSi | FeMn | Soda silicate | Basicity | Grain size |
|---|---|---|---|---|---|---|---|---|---|---|---|---|
| F5 | 29.0 | 14.9 | 8.5 | 8.2 | 13.5 | | 10.8 | 1.6 | 3.2 | 4.5 | 2.46 | Below 8 meshes, 85%. |
| F6 | 9.1 | 16.5 | 9.4 | 6.5 | 4.0 | 5.3 | 39.6 | 1.6 | 3.5 | 4.5 | 1.80 | Below 8 meshes, 95%. |
| F7 | 13.8 | 4.2 | 0.3 | 0.1 | 0.1 | 2.1 | 69.8 | 2.1 | 3.9 | 3.6 | 7.90 | Below 8 meshes, 90%. |
| F8 | 18.3 | 6.2 | 3.4 | 9.1 | 3.0 | | 50.0 | 2.9 | 2.9 | 4.2 | 1.64 | Below 8 meshes, 75%. |

In this example, metal powders of Fe-Si in 95 percent below 20 meshes, Fe-Mn in 98 percent below 20 meshes, and iron powder in 85 percent below 20 meshes were used.

TABLE 19

Chemical composition of electrode wires (percent)

| Wire | C | Si | Mn | P | S | B | Ti | Zr | Al | Ni | Cr | Mo |
|---|---|---|---|---|---|---|---|---|---|---|---|---|
| W46 | 0.04 | 0.24 | 2.24 | 0.018 | 0.012 | 0.003 | 0.48 | | | 4.8 | | |
| W47 | 0.10 | 0.13 | 1.38 | 0.016 | 0.013 | 0.021 | 0.08 | 0.06 | 0.31 | 3.9 | | |
| W48 | 0.08 | 0.18 | 0.98 | 0.021 | 0.016 | 0.010 | 0.01 | 0.36 | 0.02 | 3.1 | | |
| W49 | 0.12 | 0.20 | 0.64 | 0.018 | 0.016 | 0.048 | 0.15 | 0.08 | 0.08 | 2.4 | | |
| W50 | 0.13 | 0.45 | 1.95 | 0.031 | 0.012 | 0.008 | 0.02 | 0.21 | 0.21 | 1.0 | | |
| W51 | 0.10 | 0.02 | 1.95 | 0.018 | 0.015 | 0.036 | 0.12 | 0.12 | 0.08 | 0.3 | | |
| W52 | 0.12 | 0.08 | 3.20 | 0.014 | 0.013 | 0.021 | 0.12 | 0.10 | 0.05 | | | |
| W53 | 0.06 | 0.01 | 0.12 | 0.018 | 0.012 | 0.021 | 0.02 | 0.21 | 0.03 | | | |
| W54 | 0.08 | 0.10 | 0.84 | 0.015 | 0.012 | 0.014 | 0.03 | 0.04 | 0.21 | | | |
| W55 | 0.12 | 0.08 | 0.94 | 0.018 | 0.012 | 0.061 | 0.12 | 0.12 | 0.21 | | | |
| W56 | 0.18 | 0.58 | 1.24 | 0.012 | 0.010 | 0.025 | 0.08 | 0.08 | 0.18 | | | |
| W57 | 0.10 | 0.12 | 0.94 | 0.017 | 0.014 | 0.017 | 0.02 | 0.01 | 0.01 | | | |
| W58 | 0.12 | 0.10 | 1.21 | 0.016 | 0.012 | 0.018 | 0.48 | 0.08 | 0.08 | | | |
| W59 | 0.09 | 0.08 | 1.15 | 0.180 | 0.015 | 0.024 | 0.12 | 0.03 | 0.70 | 0.42 | | 0.60 |
| W60 | 0.07 | 0.12 | 1.18 | 0.021 | 0.014 | 0.031 | 0.12 | 0.06 | 0.08 | 2.38 | | 1.12 |
| W61 | 0.06 | 0.10 | 1.15 | 0.021 | 0.016 | 0.040 | 0.12 | 0.03 | 0.03 | | | 1.30 |
| W62 | 0.10 | 0.06 | 1.38 | 0.016 | 0.015 | 0.014 | 0.10 | 0.02 | | | 2.50 | |
| W63 | 0.10 | 0.03 | 1.21 | 0.024 | 0.014 | 0.12 | 0.08 | 0.15 | | 1.50 | 5.10 | |
| W64 | 0.12 | 0.24 | 1.08 | 0.028 | 0.018 | 0.014 | | 0.04 | 0.18 | | 6.38 | |
| W65 | 0.14 | 0.21 | 1.05 | 0.012 | 0.010 | 0.012 | 0.21 | 0.05 | 0.12 | 0.83 | | |
| W66 | 0.10 | 0.14 | 0.78 | 0.021 | 0.012 | 0.021 | 0.12 | | 0.14 | 3.14 | | |
| W67 | 0.12 | 0.02 | 0.64 | 0.025 | 0.016 | 0.043 | 0.03 | 0.14 | | 4.52 | | |
| W68 | 0.13 | 0.12 | 0.64 | 0.017 | 0.014 | 0.040 | 0.08 | 0.09 | 0.11 | 0.02 | 0.54 | 0.83 |

A test piece of base metal steel plate, 32mm thickness, having the composition as shown in Table 17 and having a 45° groove angle (front side) and 60° groove angle (back side) X groove was used, and was welded using a FCB one-side welding technique in combination with the flux shown in Table 18 and wire of Table 19. The impact values and tensile strength obtained are shown in Table 20. The welding conditions are:

Forehand electrode: 1350A-35V-36cm/min.
Backhand electrode: 1100A-50V-36cm/min.

However, the welding speed was 24cm/min., when the flux is F16, while it was 32cm/min. upon using F17, and it was 42cm/min. upon using F19.

TABLE 20

Impact value and tensile strength of deposited metal

| Wire | Flux | Impact Value (kgm.) −10 | −20 | −30 | Tensile strength, T.S. (kg./mm.²) | Elongation (percent) |
|---|---|---|---|---|---|---|
| W46 | F7 | 7.8 | 5.6 | 4.3 | 61.2 | 27 |
| W47 | F7 | 8.1 | 6.1 | 4.8 | 60.3 | 28 |
| W48 | F7 | 6.8 | 5.2 | 4.1 | 57.8 | 28 |
| W49 | F7 | 7.3 | 5.5 | 3.8 | 58.2 | 29 |
| W50 | F6 | 6.4 | 5.0 | 3.5 | 60.9 | 24 |
| W51 | F5 | 5.9 | 4.9 | 3.6 | 61.2 | 24 |
| W52 | F7 | 4.5 | 4.3 | 2.5 | 65.4 | 23 |
| W53 | F8 | Blow-hole generated | | | | |
| W54 | F8 | 2.8 | 2.1 | 1.6 | 57.3 | 27 |
| W55 | F5 | Crack generated (lateral crack) | | | | |
| W55 | F7 | 3.6 | 2.8 | 2.1 | 61.2 | 24 |
| W57 | F7 | 4.5 | 3.1 | 1.9 | 56.4 | 21 |
| W58 | F6 | 3.3 | 2.5 | 1.6 | 67.1 | 24 |
| W59 | F6 | 6.6 | 5.1 | 3.5 | 61.2 | 26 |
| W60 | F6 | 6.9 | 5.5 | 3.9 | 64.5 | 24 |
| W61 | F7 | 4.8 | 4.0 | 3.6 | 70.4 | 18 |
| W62 | F7 | 6.4 | 4.5 | 3.3 | 61.2 | 24 |
| W63 | F6 | 5.5 | 5.0 | 3.3 | 62.4 | 24 |
| W64 | F7 | Crack generated | | | | |
| W65 | F7 | 6.4 | 5.3 | 4.5 | 61.3 | 27 |
| W66 | F6 | 5.8 | 5.5 | 4.7 | 63.3 | 27 |
| W67 | F6 | Crack generated | | | | |
| W68 | F7 | 7.8 | 5.5 | 4.3 | 60.9 | 24 |
| AB std | | >5.3 | >4.1 | >2.8 | | |

NOTE.—(The impact values are obtained by the average of five pieces.)

Having now fully described the invention, it will be apparent to one of ordinary skill in the art that many changes and modifications can be made without departing from the spirit or scope of the invention. Accordingly, what is intended to be covered by Letters Patent is:

We claim:

1. In a method of submerged arc welding of high tensile strength steel containing trace amounts of vanadium or niobium, the improvement which comprises using steel welding wire containing 0.2–2.5 percent Mn, 0.002–0.05 percent boron and at least one additive metal selected from the group consisting of Titanium, Aluminum and Zirconium, wherein the total quantity of the additive metal is from 0.005–0.5 percent.

2. The method of claim 1, wherein the steel welding wire further contains at least one additional additive metal selected from the group consisting of:

| less than | 5% Nickel |
| less than | 1.2% Molybdenum, and |
| less than | 6% Chromium. |

3. In a method of submerged arc welding of high tensile strength steel containing trace amounts of vanadium or niobium, the improvement comprising using a steel welding wire and a flux consisting of a non-metallic powder and a metallic powder, said steel wire comprising 0.02–2.5 percent Manganese, 0.002–0.05 percent Boron and at least one additive metal selected from the group consisting of Titanium, Aluminum and Zirconium, wherein the total quantity of the additive metal is from 0.005–0.5 percent, said metal powder portion of said flux comprising

| 5–75% | Iron powder |
| less than 5% | Si |
| less than 10% | Mn | wherein more than 80% of the powder grains are smaller than 20 mesh in size, and said non-metallic powder portion of said flux comprises 15–60 percent MgO, and at least one material selected from the group consisting of carbonate and oxalate in an amount of from 3–40 percent, and the balance being a slag producing agent, wherein the basicity of the flux expressed in terms of the ratio of basic oxide content to the acid oxide content is above 1.0, and wherein the particle size of more than 70 percent of the entire flux is smaller than 8 mesh.

* * * * *